March 22, 1949.   R. E. MILLER   2,464,986
APPARATUS FOR CONTROLLING THE SELECTIVE
OPERATION OF CLUTCHES
Filed Nov. 30, 1944
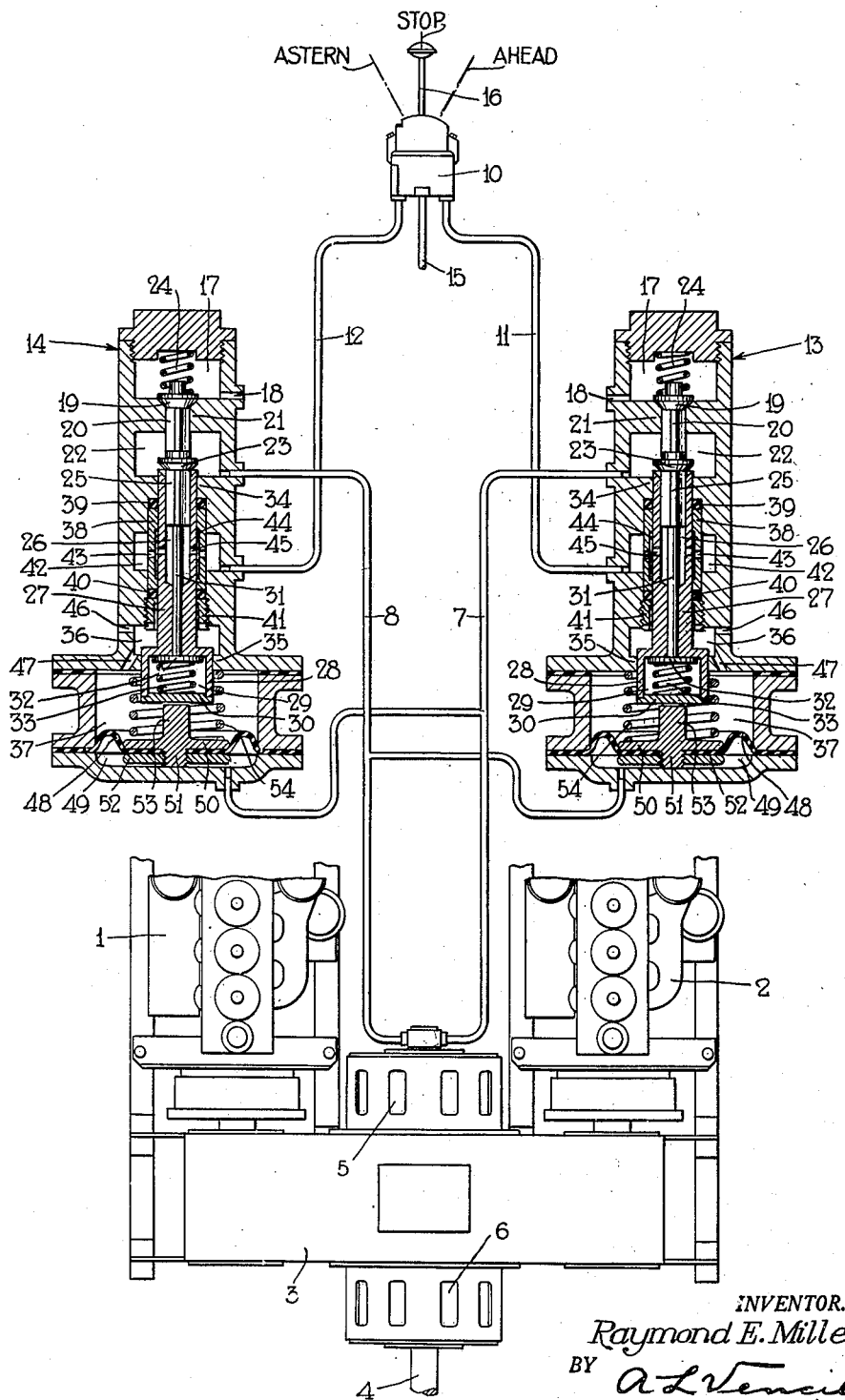
INVENTOR.
Raymond E. Miller
BY A. L. Vencill
His Attorney Patented Mar. 22, 1949

2,464,986

UNITED STATES PATENT OFFICE 2,464,986

APPARATUS FOR CONTROLLING THE SELECTIVE OPERATION OF CLUTCHES

Raymond E. Miller, Wilkinsburg, Pa., assignor to The Westinghouse Air Brake Company, Wilmerding, Pa., a corporation of Pennsylvania Application November 30, 1944, Serial No. 565,913

4 Claims. (Cl. 60—97)

This invention relates to control apparatus and more particularly to means for controlling the selective operation of a plurality of devices such as clutches.

On certain ships employing Diesel engines for propulsion, two engines connected for operation together are employed for operating a single propeller. In the connection between the engines and the propeller are reversing means controlled by two clutches, namely, an ahead clutch for causing operation of the propeller by the engines to drive the ship forward, and a reverse clutch for causing operation of the propeller by the engines to drive the ship astern.

In certain service these forward and reverse clutches are controlled pneumatically, being rendered effective by fluid under pressure and ineffective upon the release of fluid under pressure. An operator's control device is provided for releasing fluid under pressure from both the forward and reverse clutches to disconnect the engines from the propeller. The operator's control device is also operable to supply fluid under pressure to either clutch to render it effective and to at the same time release fluid under pressure from the other clutch to render it ineffective. It will thus be seen, that the operator by suitable operation of his control device can select the direction of movement of the ship, or if desired, disconnect the engines from the propeller in order to permit the ship to stop.

If the ship is moving in a forward direction and the operator desires to reverse the direction of movement as quickly as possible, he will condition his control device to release fluid under pressure from the forward clutch and to at the same time supply fluid under pressure to operate the reverse clutch. In case the ship is moving in an astern direction and the operator desires to reverse the direction of movement to forward, as quickly as possible, he will operate or condition his control device to release fluid under pressure from the reverse clutch and to at the same time supply fluid under pressure to operate the forward clutch. In either case it is very desirable that the one clutch shall become ineffective before the other becomes effective, so as to prevent damage to the clutches.

One object of the invention is therefore the provision of novel control apparatus for controlling operation of two clutches or the like and embodying means for preventing either clutch from becoming effective while the other clutch is still effective.

Other objects and advantages will be apparent from the following more detailed description of the invention.

In the accompanying drawing, the single figure is a diagrammatic view, partly in section and partly in outline, of a control apparatus embodying the invention.

Description

The improved control apparatus is shown in the drawing, merely for the purpose of illustration, associated with a ship's propulsion system comprising two internal combustion engines 1 and 2 arranged to be connected together through a reduction gear or the like designated by the reference numeral 3 to a propeller shaft 4 for driving said shaft to turn the ship's propeller (not shown). The reduction gear 3 is of the type embodying means for reversing the direction of rotation of the propeller shaft 4 with respect to the direction of operation of engines 1 and 2, and to this end comprises an ahead or forward clutch means 5 adapted to be operated by fluid under pressure to connect the shaft 4 to the engines in such a manner as to cause forward movement of the ship, and a reverse clutch means 6 adapted to be operated by fluid under pressure to connect the shaft 4 to the engines in such a manner as to cause astern movement of the ship. Fluid under pressure is adapted to be supplied to and released from the ahead clutch means 5 to control its operation by way of an ahead clutch pipe 7, while fluid under pressure is adapted to be supplied to and released from the astern clutch means 6 by way of an astern clutch pipe 8.

The propulsion system above described is conventional and well known to those skilled in the art, and since the invention is limited to means for controlling the supply of fluid under pressure to and its release from the pipes 7 and 8, no further description of said system is essential to a clear understanding of the invention, which will now be described.

An operator's control valve device 10 is provided for controlling the pressure of fluid in pipes 7 and 8 by way of pipes 11 and 12 and interlock valve devices 13 and 14.

The operator's control valve device 10 may be of any suitable structure, such for example as of the type disclosed in Patent No. 2,329,742, issued to Rankin J. Bush et al. on September 21, 1943, and which comprises a casing to which pipes 11 and 12 are connected, as well as a pipe 15 through which fluid under pressure from any suitable source is adapted to be constantly supplied to said device. The control valve device further comprises an operator's lever 16 having a neutral or "Stop" position, an "Ahead" position at one side of "Stop" position and an "Astern" position at the opposite side of "Stop" position. In the casing of the control device 10 are valve means (not shown) arranged for control by lever 16 in such a manner as to open both pipes 11 and 12 to atmosphere in the "Stop" position of said lever. In the "Ahead" position of lever 16 the valve means in the control device 10 will open pipe 11 to the fluid pressure supply pipe 15 so as to supply fluid under pressure to said pipe, and at the same time will open pipe 12 to atmosphere. In the "Astern" position of lever 16, the valve means in the control device 10 will open pipe 12 to the fluid pressure supply pipe 15 and at the same time open pipe 11 to atmosphere. Since control valve devices of this type are so well known, and since reference may be made to the patent hereinbefore referred to, a further description of the control valve device 10 is not deemed essential to a clear understanding of the invention.

The two interlock valve devices 13 and 14 are of identical construction and each comprises a casing having a chamber 17 open to atmosphere through an exhaust port 18 and containing a poppet valve 19. The valve 19 has a fluted stem 20 extending through a wall 21 in the casing into a chamber 22 wherein it engages a coaxially arranged poppet valve 23. The wall 21 has a seat for engagement by valve 19 and a spring 24 in chamber 17 acts on said valve to urge it to its seat.

The valve 23 has a fluted stem 25 slidably mounted in a bore 26 provided in a plunger 27, one end of which plunger terminates in chamber 22 and is provided with a seat for engagement by said valve. The opposite end of plunger 27 has an enlargement 28 provided with a counterbore 29 the open end of which is closed by a cover 30. A pin 31 engaging the end of valve stem 25 extends through bore 26 and an axial bore in plunger 27 connecting bore 26 to counterbore 29, and in said counterbore said pin is provided with a head 32. A coil spring 33 contained in counterbore 29 has one end engaging head 32 while the opposite end bears against cover 30. Spring 33 is under pressure urging the plunger 27 in a direction away from the valve 23, but its pressure on the pin head 32 is less than that of spring 24 on the poppet valve 19, for reasons which will be later described.

Adjacent chamber 22 the plunger 27 is slidably mounted in a bore provided through a wall 34, while the plunger enlargement 28 is slidably mounted in a bore provided through a wall 35 which separates a chamber 36 from a chamber 37.

The casing has a bore extending from wall 34 to chamber 36, and disposed in this bore is a sleeve 38 in which the plunger 27 is adapted to reciprocate. A ring 39 is disposed in space between wall 34 and one end of sleeve 38, while a similar ring 40 is disposed between the opposite end of said sleeve and a sleeve 41 also provided in the casing bore adjacent chamber 36 and preferably secured in position by screw-threaded engagement with the wall of said bore. Each of the rings 39 and 40 encircles and has sealing and sliding contact with the peripheral surface of plunger 27, to prevent leakage of fluid under pressure along the plunger from one side of the ring to the opposite side. Between the ends of sleeve 38, the casing is provided with an annular chamber 42 encircling said sleeve, and this chamber is open through one or more ports 43 in said sleeve to an annular recess 44 provided in the inner surface of said sleeve around the plunger 27. The plunger 27 has one or more ports 45 connecting bore 26 therein to the recess 44.

Chamber 36 is in constant communication with the atmosphere through a port 46, and chamber 37 is also constantly open to atmosphere through a port 47 leading to chamber 36.

Chamber 37 is provided at one side of a movable abutment, preferably in the form of a flexible diaphragm 48. At the opposite side of diaphragm 48 is a fluid pressure control chamber 49. A diaphragm follower 50 disposed in chamber 37 in contact with one side of diaphragm 48 is provided centrally with a stud 51 extending through an aperture in the center of said diaphragm into chamber 49. A follower 52 in chamber 49 is mounted on stud 51 and tightened against the diaphragm to securely clamp the two followers to the diaphragm. The stud 51 is arranged to contact the casing end wall of chamber 49.

Extending in the opposite direction from follower 50 is a boss 53 arranged to contact cover 30 of plunger 27. With head 32 on the end of pin 31 in contact with the bottom of counterbore 29 and with the valve 23 thus open, and with valve 19 seated, the boss 53 may be either just in contact with or slightly spaced from the cover 30, as shown in the drawing. A precompressed coil spring 54 contained in chamber 37 and encircling the enlargement 28 of plunger 27 has one end supported on wall 35 while the opposite end bears against the diaphragm follower 50.

The operation of each of the interlock devices 13 and 14 is as follows. When fluid is supplied to chamber 49 at a pressure sufficient to deflect diaphragm 48 against the opposing pressure of spring 54, said diaphagm will act through follower 50 and boss 53 to move the plunger 27 in the direction of valve 23. Since the pressure of spring 24 is greater than that of spring 33, this movement of plunger 27 will be relative to valve 23 until it seats against said valve which will close communication between chambers 22 and 42. Further movement of plunger 27 will then act to move the valve 23 and through stem 20 will unseat the valve 19 to open communication between chambers 17 and 22. When fluid under pressure is released from chamber 49 to permit diaphragm 48 to be returned to the position in which it is shown in the drawing by pressure of spring 54, the spring 24 will act to move the valves 19 and 23 and plunger 27 with the diaphragm until the valve 19 seats, following which spring 33 will hold the valve 23 against further movement and at the same time will move plunger 27 relative to and out of seating engagement with valve 23 and back to its normal position as shown in the drawing, thereby first closing communication between chambers 22 and 17 and then opening chamber 22 to chamber 42.

In the interlock valve device 13, chamber 42 is connected to pipe 11 from the operator's control valve device 10, chamber 22 is connected to the ahead clutch control pipe 7, and diaphragm chamber 49 is connected to the astern clutch control pipe 8. In the interlock valve device 14 chamber 42 is connected to pipe 12 from the operator's control valve device 10, chamber 22 is connected to the astern clutch control pipe 8, and diaphragm chamber 49 is connected to the ahead clutch control pipe 7.

Operation of control apparatus

Let it be assumed that the operator's control lever 16 is initially in "Stop" position opening both pipes 11 and 12 to atmosphere. With the lever thus positioned the diaphragm chambers 49 in both interlock devices 13 and 14 will likewise be open to atmosphere and the parts of said devices will be the position in which they are shown in the drawing. With valves 23 thus open connecting the clutch control pipes 7 and 8 to pipes 11 and 12, respectively, which are open to atmosphere, the ahead and astern clutch means 5 and 6 will be ineffective thus disconnecting the propeller shaft 4 from engines 1 and 2.

If the operator now desires to move the ship forward he will move his control lever 16 to the "Ahead" position, and fluid under pressure will be supplied to pipe 11, while pipe 12 will be maintained open to atmosphere. Fluid under pressure thus supplied to pipe 11 will flow to chamber 42 in the interlock valve device 13, thence past the open valve 23 to chamber 22 in said device and from said latter chamber through pipe 7 to the ahead clutch means 5. The ahead clutch means 5 will thereby be operated to connect the engines 1 and 2 to the propeller shaft 4, whereby with said engines operating the ship will move in an ahead direction.

If the operator now moves lever 16 from "Ahead" position back to "Stop" position, fluid under pressure will be released from the ahead clutch means 5 by way of pipe 7, past the open valve 23 in the interlock valve device 13 and thence through pipe 11, as will be apparent, so as to disconnect the propeller shaft 4 from the engines 1 and 2, so that the ship may stop.

If with control lever 16 in "Stop" position, the operator desires to move the ship astern, he will move said lever to "Astern" position to supply fluid under pressure to pipe 12 while maintaining pipe 11 open to atmosphere. Fluid under pressure thus supplied to pipe 12 will flow to chamber 42 in the interlock valve device 14, and thence past valve 23 to chamber 22 in said device and from said latter chamber through the astern clutch pipe 8 to the astern clutch means 6. The astern clutch means 6 will thereby be operated to connect the propeller shaft 4 to the engines so that with the engines operating, the ship will move in an astern direction.

If the operator now desires to stop the ship from movement in an astern direction, he will move lever 16 to "Stop" position for releasing fluid under pressure from pipe 12, whereupon fluid under pressure will be released from the astern clutch means 6 past the open valve 23 in the interlock device 14, as will be apparent. The propeller shaft 4 will therefore be disconnected from the engines so that the ship may stop.

When fluid under pressure is supplied to the ahead clutch control pipe 7 to operate the ahead clutch means 5 as above described, fluid under pressure from said pipe also flows into chamber 49 of the interlock valve device 14 and therein acts on diaphragm 48 in opposition to pressure of the respective spring 54. The pressure of this spring is such that when the pressure of fluid in chamber 49 is increased to a chosen degree, such as ten pounds, the diaphragm 48 in the interlock valve device 14 will deflect and close valve 23 and open valve 19 to thereby close communication between pipe 12 and the astern control pipe 8 and open the latter pipe to atmosphere. When, subsequently, fluid under pressure is released from the ahead clutch control pipe 7, the interlock valve device 14 will operate when the pressure in said pipe and the respective diaphragm chamber 49 is reduced to below the chosen degree (ten pounds) above mentioned, to close communication between the astern clutch control pipe 8 and atmosphere and reopen said pipe to pipe 12. It will now be seen that when the operator's control lever is in "Ahead" position, the parts of the interlock valve device 13 will remain in the position shown in the drawing connecting pipes 11 and 7, but the interlock valve device 14 will operate to close communication between pipes 8 and 12 and hold this communication closed as long as the pressure of fluid in the ahead clutch control pipe 7 is in excess of the chosen pressure of ten pounds.

In a manner which will be apparent from the above description, the interlock valve device 13 will be operated by fluid under pressure from the astern clutch control pipe 8 to close communication between pipes 7 and 11 and to open pipe 7 to atmosphere when the operator's control lever 16 is in the "Astern" position and the pressure of fluid in pipe 8 exceeds the chosen degree of ten pounds. When the pressure in the astern clutch control pipe 8 is reduced to below the chosen pressure of ten pounds, the interlock valve device 13 will operate to choose communication between the ahead clutch control pipe 7 and atmosphere, and reopen said pipe to pipe 11. With the operator's control lever 16 in the "Astern" position the parts of the interlock valve device 14 will remain in the position in which they are shown in the drawing due to the respective diaphragm chamber 49 being open to atmosphere either past open valve 19 in the interlock valve device 13, or by way of pipe 11 when said valve is closed.

The purpose of the interlock valve devices 13 and 14 will now be described.

Let it be assumed that the ship is being propelled ahead under which condition the operator's control lever will be in the "Ahead" position supplying fluid under pressure to the ahead clutch control pipe 7, due to which the interlock valve device 14 will be conditioned by such pressure to close communication between pipe 12 and the astern clutch control pipe 8 and to open the latter pipe to atmosphere through chamber 22, valve 19, chamber 17 and port 18.

Now assume that the operator desires to reverse the direction of movement of the ship as quickly as possible. To accomplish this he will move his control lever 16 from the "Ahead" position to the "Astern" position. In the "Astern" position the pipe 11 will be opened to atmosphere for releasing fluid under pressure from the ahead clutch control pipe 7 and from diaphragm chamber 49 in the interlock valve device 14, while fluid under pressure will at the same time be supplied to pipe 12. The interlock valve device 14 will however prevent flow of fluid under pressure from pipe 12 to the astern clutch control pipe 8 and maintain the latter pipe open to atmosphere until the pressure of fluid in the ahead control pipe 7 and in the respective diaphragm chamber 49 is reduced to below the chosen pressure of ten pounds, above mentioned. When the pressure in the ahead clutch control pipe 7 becomes reduced to below this chosen degree however, the interlock valve device 14 will be promptly operated by the respective spring 54 to disconnect the astern control pipe 8 from atmosphere and to connect same to pipe 12. Fluid under pressure supplied to pipe 12 by the operator's control device 10 with lever 16 in the "Astern" position, will then flow to pipe 8 to effect operation of the astern clutch means 6 to connect the engines 1 and 2 to the propeller shaft 4 for causing the ship to move astern.

A certain pressure of fluid, such as the ten pounds above mentioned, is required to render the clutch means 5 or 6 effective, and when the pressure is of a lower degree, said clutch means will be ineffective. From the above description it will therefore be apparent, that when the operator moves lever 16 from "Ahead" position to "Astern" position to cause a rapid reversal in the direction of movement of the ship, the interlock valve device 14 acts to prevent the reverse clutch means 6 from becoming effective until after the ahead clutch means 5 becomes ineffective.

In a manner which will now be readily apparent from the above description the interlock valve device 13 will act in case the operator moves his control lever 16 from the "Astern" position directly to "Ahead" position, to prevent the ahead clutch means 5 becoming effective until after the reverse clutch means 6 is rendered ineffective.

Summary

From the above description it will now be apparent, that I have provided means whereby in a reversible propulsion system of the type embodying forward and reverse clutch means, both of said clutch means may be rendered ineffective at the same time, or either one may be selectively rendered effective, but both cannot be rendered effective at the same time.

Having now described my invention what I claim as new and desire to secure by Letters Patent is:

1. A control mechanism for a pair of fluid actuators comprising valve means for selectively supplying fluid under pressure to each of said actuators, a member for actuating said valve means, and interlock means for each actuator controlled by pressure of fluid in the other actuator and operable to close the fluid pressure supply communication to and to open the respective actuator to atmosphere except when the pressure of fluid in the other actuator is less than a chosen degree.

2. A control mechanism for a pair of fluid actuators comprising valve means for selectively supplying fluid under pressure to each of said actuators, a member for actuating said valve means, and an interlock means for each actuator comprising valve structure for controlling communication between said valve means and the respective actuator and selectively operable to either open said communication or to close said communication, a spring, and a power element subject to opposing pressures of said spring and of fluid in the other actuator and operable to effect operation of said valve structure to its communication closing position except when the pressure of fluid in said other actuator is less than the pressure of said spring.

3. A control mechanism for a pair of fluid actuators comprising valve means for selectively supplying fluid under pressure to each of said actuators, a member for actuating said valve means, and an interlock means for each actuator comprising valve structure for controlling communication between said valve means and the respective actuator and selectively operable to either open said communication or to close said communication, a power element operable by pressure of fluid in the other actuator to effect operation of said valve structure to close said communication, and a spring opposing pressure of fluid on said power element for effecting operation of said valve structure to open said communication except when the pressure of fluid on said power element exceeds a chosen degree.

4. A control mechanism for a pair of fluid pressure controlled actuators comprising a fluid pressure supply and release pipe for each actuator, valve means for selectively supplying fluid under pressure to either one of said pipes and for at the same time releasing fluid under pressure from the other pipe, an interlock structure for each actuator comprising valve means controlling communication between the respective actuator and the respective one of said pipes and having a closed position for closing said communication and for opening the respective actuator to atmosphere and having an open position for opening said communication and for disconnecting the respective actuator from atmosphere, each interlock means further comprising a spring and power means controlled by opposing pressures of said spring and pressure of fluid in the other actuator and operable to move said valve means to its open position except when the pressure of controlling fluid exceeds the opposing force of said spring.

RAYMOND E. MILLER.

REFERENCES CITED

The following references are of record in the file of this patent:

UNITED STATES PATENTS

| Number | Name | Date |
|---|---|---|
| 1,955,154 | Temple | Apr. 17, 1934 |
| 2,003,351 | Eells | June 4, 1935 |
| 2,268,143 | Schmitter et al. | Dec. 30, 1941 |
| 2,270,785 | Petroe | Jan. 20, 1942 |
| 2,286,873 | Schwartz | June 16, 1942 |
| 2,286,880 | Traut | June 16, 1942 |
| 2,366,020 | Good | Dec. 26, 1944 |
| 2,420,856 | Brill et al. | May 20, 1947 |
| 2,438,683 | Rohrer | May 30, 1948 |